US012117210B2

United States Patent
Kernich et al.

(10) Patent No.: US 12,117,210 B2
(45) Date of Patent: Oct. 15, 2024

(54) MONITORING SYSTEM FOR HEATED FLUIDS

(71) Applicant: Rheem Australia PTY Limited, Rydalmere (AU)

(72) Inventors: Lee Kernich, Rydalme (AU); Brendan Bourke, Rydalme (AU)

(73) Assignee: Rheem Australia PTY Limited, Rydalmere (AU)

( * ) Notice: Subject to any disclaimer, the term of this patent is extended or adjusted under 35 U.S.C. 154(b) by 0 days.

(21) Appl. No.: 17/626,235

(22) PCT Filed: Jul. 10, 2020

(86) PCT No.: PCT/AU2020/050718
§ 371 (c)(1),
(2) Date: Jan. 11, 2022

(87) PCT Pub. No.: WO2021/007611
PCT Pub. Date: Jan. 21, 2021

(65) Prior Publication Data
US 2022/0260282 A1 Aug. 18, 2022

(30) Foreign Application Priority Data
Jul. 12, 2019 (AU) ................................ 2019902469
Feb. 6, 2020 (AU) ................................ 2020900322

(51) Int. Cl.
*F24H 15/45* (2022.01)
*F24H 9/20* (2022.01)
(Continued)

(52) U.S. Cl.
CPC ........... *F24H 9/2021* (2013.01); *F24H 9/455* (2022.01); *F24H 15/104* (2022.01);
(Continued)

(58) Field of Classification Search
CPC .................................................... F24H 15/225
See application file for complete search history.

(56) References Cited

U.S. PATENT DOCUMENTS

| 4,786,383 A | 11/1988 | Houle |
| 2014/0334807 A1 | 11/2014 | Farris |

(Continued)

FOREIGN PATENT DOCUMENTS

| AT | 396175 B | * 4/1993 | .............. C23F 13/02 |
| CN | 107166736 A | * 9/2017 | ........... F24H 9/2021 |

(Continued)

OTHER PUBLICATIONS

AT-396175-B English Translation (Year: 1993).*
(Continued)

*Primary Examiner* — Steven S Anderson, II
*Assistant Examiner* — Kurt J Wolford
(74) *Attorney, Agent, or Firm* — Eversheds Sutherland (US) LLP

(57) ABSTRACT

A monitoring system for monitoring parameters of a fluid heater is disclosed. The heater comprises a storage vessel for storing heated fluid therein. The monitoring system includes a first sensor and associated first electrical metering circuitry, a second sensor and associated second electrical metering circuitry, and a control switch. The control switch is operable to adopt a first mode of operation in which the first electrical metering circuitry is activated and a second mode of operation in which the second electrical metering circuitry is activated. The monitoring system also includes a controller for causing periodic operation of the control switch so that it switches between the first and second modes of operation.

17 Claims, 3 Drawing Sheets

(51) Int. Cl.
  *F24H 9/45*      (2022.01)
  *F24H 15/104*    (2022.01)
  *F24H 15/144*    (2022.01)
  *F24H 15/20*     (2022.01)
  *F24H 15/223*    (2022.01)
  *F24H 15/225*    (2022.01)
  *G01K 1/14*      (2021.01)
  *G01K 7/16*      (2006.01)
  *G01N 17/04*     (2006.01)
  *G05D 23/19*     (2006.01)
  *G05D 23/24*     (2006.01)
  *F24H 15/395*    (2022.01)

(52) U.S. Cl.
  CPC .......... *F24H 15/144* (2022.01); *F24H 15/20* (2022.01); *F24H 15/223* (2022.01); *F24H 15/225* (2022.01); *F24H 15/45* (2022.01); *G01K 1/14* (2013.01); *G01K 7/16* (2013.01); *G01N 17/04* (2013.01); *G05D 23/1927* (2013.01); *G05D 23/24* (2013.01); *F24D 2220/04* (2013.01); *F24H 15/395* (2022.01)

(56) References Cited

U.S. PATENT DOCUMENTS

2019/0170398 A1    6/2019  Chaudhry et al.
2021/0095891 A1*   4/2021  Hazzard ............... F24H 9/2021

FOREIGN PATENT DOCUMENTS

| EP | 1426467 A1     | 6/2004 |
| EP | 1666809 A1     | 6/2006 |
| FR | 3044089 A1     | 5/2017 |
| WO | 88/05160 A     | 7/1988 |
| WO | 2007010335 A1  | 1/2007 |

OTHER PUBLICATIONS

CN-107166736-A English translation (Year: 2017).*
Veilleux, How to extend the life of a water heater (Year: 2019).*
International Search Report and Written Opinion for PCT Application No. PCT/AU2020/050718 dated Aug. 13, 2020.

* cited by examiner

MONITORING SYSTEM FOR HEATED FLUIDS

CROSS REFERENCE TO RELATED APPLICATION

This application is a National Stage Entry of, and claims priority to, PCT Patent Application No. PCT/AU2020/050718, which was filed on 10 Jul. 2020, which claims priority to, and the benefit of, Australian Patent Application Nos. 2020900322, which was filed on 6 Feb. 2020, and 2019902469, which was filed on 12 Jul. 2019. The entire contents and substance of the aforementioned applications are hereby incorporated by reference in their entireties as if fully set forth herein.

TECHNICAL FIELD

This disclosure relates generally to fluid heating and storage apparatus and more particularly, but not exclusively to electric water heaters. The disclosure is particularly concerned with a monitoring system for use in heating and storage apparatus.

BACKGROUND ART

Renewable energy is now becoming very common due to the climate change issues associated with burning of fossil fuels. Popular renewable energy solutions such as wind and photovoltaic power are intermittent sources of energy supply that can create grid management challenges for the power companies and energy regulators. The electric water heater has now been identified as a useful component for assisting utility service providers for example in managing grid stability.

SUMMARY DISCLOSURE

In a first aspect embodiments are disclosed of a monitoring system for monitoring selected parameters of a fluid heater, the heater comprising a storage vessel for storing heated fluid therein, the monitoring system comprising a first sensor and associated first electrical metering circuitry, a second sensor and associated second electrical metering circuitry, a control switch which is operable so as to be able to adopt a first mode of operation in which the first electrical metering circuitry is activated and a second mode of operation in which the second electrical metering circuitry is activated, and, a controller for causing periodic operation of the control switch so that it switches between the first and second modes of operation.

In certain embodiments the monitoring system further includes a data transmitter which is associated with the first and second metering circuiting for transmitting collected data to a remote or local location.

In certain embodiments the system includes a power source associated with the system. In certain embodiments the power source is a DC power supply.

In certain embodiments the first sensor is a temperature sensor for sensing the temperature of the fluid within the storage vessel.

In certain embodiments the temperature sensor comprises a length of wire configured in the form of one or more loops, which, when installed extends from one end of the storage vessel towards an opposite end thereof, the wire loop having two ends, one being in electrical contact with the storage vessel and the other end being operatively connected to the first associated electrical circuitry, the sensor wire being adapted so as to exhibit temperature dependent resistance along its length and facilitate the determination of the average temperature of the fluid within the storage vessel.

In certain embodiments each loop extends from one end of the storage vessel to the other.

In certain embodiments temperature sensors of this type are referred to as an integrating temperature averaging sensor or averaging temperature sensing wire.

Such an arrangement is described in PCT application PCT/AU1987/000445 (WO1988/005160) the contents of which are incorporated into this specification by cross-reference thereto.

In certain embodiments the second sensor is in the form of an impressed current anode disposed within the storage vessel. The anode is used to monitor any deterioration of the storage vessel monitoring an electric current through the water and to the storage vessel wall. The anode uses an external power source to develop a high potential difference between the surface of the storage vessel and the anode. The power source is the DC power supply referred to earlier. The anode may be formed from any suitable metal one example of which is titanium.

In certain embodiments the monitoring system includes a housing which, when installed is operatively mounted so as to extend into the storage vessel and is arranged to enclose that part of the length of wire therein.

In certain embodiments the housing comprises an elongated substantially tubular body having a closed inner end.

In certain embodiments the housing is configured so as to form at least part of the impressed current anode.

In certain embodiments the monitoring system includes a fitting to which the first and second sensors are mounted, the fitting being adapted to be secured to a wall section of the storage vessel.

In certain embodiments housing is operatively mounted to the fitting.

In a further aspect embodiments are disclosed as a method of retrofitting a fluid heater with a monitoring system as described above wherein the fluid heater comprises a storage vessel having a vessel wall and a port in the vessel wall, wherein the fitting is configured so as to be operatively connected to the port, the method comprising the steps of locating the first and second sensors within the interior of the storage vessel and securing the fitting to the storage vessel in the region of the port.

The storage vessel may include a coupling member at the port, the fitting being connected to the coupling member. The fitting and the coupling member may comprise complementary threaded sections providing for the connection therebetween. The heater may include a sacrificial type anode which is mounted to the vessel wall so as to extend into the interior through the part, the method including removing the sacrificial type anode and replacing it with the first and second sensors.

BRIEF DESCRIPTION OF THE DRAWINGS

Notwithstanding any other forms which may fall within the scope of the method and apparatus set forth in the summary, specific embodiments of the method and apparatus will now be described by the way of example and with reference to the accompanying drawing in which.

DETAILED DESCRIPTION

Figure 1:
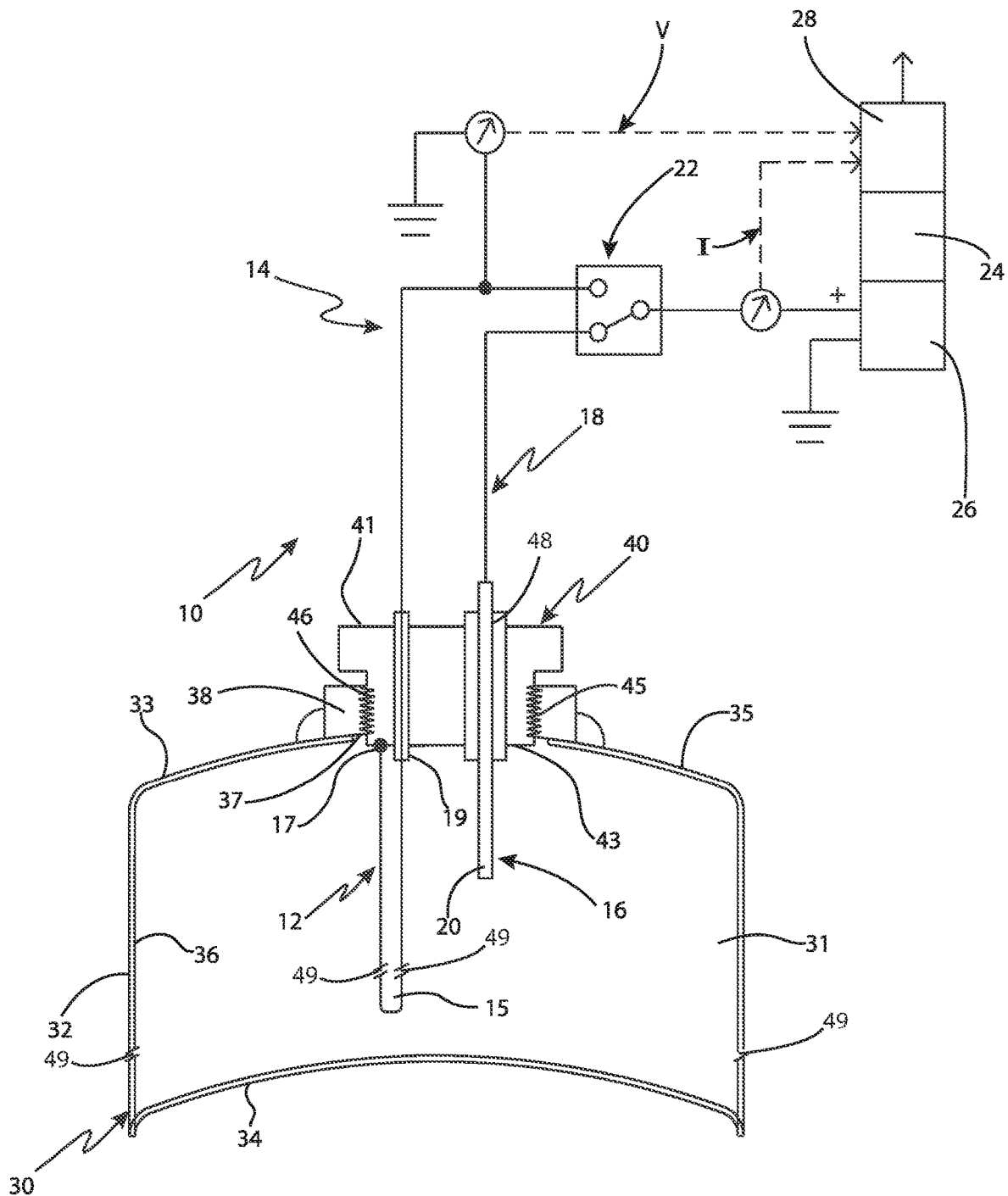
FIG. 1 is a schematic illustration of a monitoring system according to one embodiment.

Referring to the drawing there is shown a monitoring system 10 for use in an electrical hot water heater 30. The water heater 30 comprises a storage vessel 32 for storing the water to be heated. The storage vessel comprises a vessel wall 35 with an interior 31 and opposed ends 33 and 34. The vessel is disposed in an upright orientation with one end being an upper end 33 and the opposed end being a lower end 34. The vessel wall 35 has an inner surface 36 and a port 37 with an associated coupling member 38 with a threaded section 45.

The monitoring system 10 comprises a first sensor 12 and associated electrical circuitry metering 14 for sensing the average temperature of the water within the storage vessel 32.

The temperature sensor 12 comprises a length of wire configured in the form of a loop 15. The wire loop 15 extends from one end 33 of the storage vessel towards the opposite end 34 thereof, and extends across a substantial proportion of the height of the storage vessel so as to sense accurately the average temperature of the water. This is indicated in FIG. 1 by the discontinuities 49 in the wall of the storage vessel or tank 32, and the respective discontinuities 49 in the loop 15, which indicated the bottom end of the loop 15 is located at or close to the lower end 34 of the storage vessel or tank 32. The wire loop 15 has two ends 17 and 19, one end 17 being in electrical contact with the storage vessel and the other end 19 being operatively connected to the first associated electrical circuitry 14. The sensor 12 and circuitry 14 is adapted to sense the temperature of the water within the storage vessel 32 via the wire's resistance, where the voltage and current measurements are used to determine the wire's resistance, whereby this leads to the calculation of the average temperature of the water within the storage vessel 32. The sensor 12 is operated at a time interval to give periodic reports of the average temperature of the water.

The monitoring system 10 further comprises a second sensor 16 and associated electrical metering circuitry 18. The sensor 16 is in the form of an impressed current anode 20 or powered anode disposed within the storage vessel 32. The anode 20 is used to provide a protection current that prevents corrosion and deterioration of the storage vessel 32. The anode 20 conducts electricity in the water of the storage vessel 32, thereby providing cathodic protection to the inner wall. The sensor 16 and circuitry 18 is adapted to monitor the current flow and hence deterioration detection of the inner wall surface of the vessel 32. The interior 31 of the vessel wall may be coated with vitreous enamel which is an electrical insulator. As the enamel dissolves, the metal (eg steel) from which the vessel is formed becomes exposed. For a fixed voltage the current increases. Furthermore, the storage vessel 32 is assumed not protected when the power of the anode 20 is low or turned off. An electric current is generated from the anode to the vessel wall from a DC power source 26. The power source 26 is used to provide power to the monitoring system as a whole.

The monitoring system 10 further includes a switch 22 which is operable to selectively activate the temperature sensor metering circuitry or the anode metering circuitry. The switch 22 shown is adapted to be in a first position where the circuitry associated with the anode is activated (as illustrated in the drawing) or in a second position where the circuitry associated with the temperature sensor is activated. In certain embodiments, the switch may have a neutral or off position where neither circuitry is activated.

A controller 24, is in the form of a microprocessor, controls the operation of the switch 22 so that it periodically alternates the power supply between the circuitry connections associated with the temperature sensor unit 12 and the anode sensor unit 16. The data provided by the metering circuitry and schematically shown as voltage measurement V and current measurement I is delivered to a processor and communications path 28 from which the data can be sent to a remote site or device where it can be analysed and the user notified of need for service attention. The data can be used to measure the energy content of the water in the vessel and the condition of the vitreous enamel coating.

The system further includes a fitting 40 which comprises a fitting body 41 to which the first and second sensors 12 and 16 are mounted so as to provide for a sensor assembly 43. The impressed current anode 20 passes through an insulating sleeve 48 in the fitting 40. The fitting 40 is adapted to be secured to the storage vessel wall 35 so that the sensors 12 and 16 are disposed within the interior 31 of the storage vessel 30. The sensors extend into the vessel interior 31 through a port 37 in the wall 32 thereof. A coupling member 38 is secured to the wall in the region of the port 37. The fitting and the coupling member 38 have complementary threaded sections 45 and 46 for securing the fitting in position.

Figure 2:
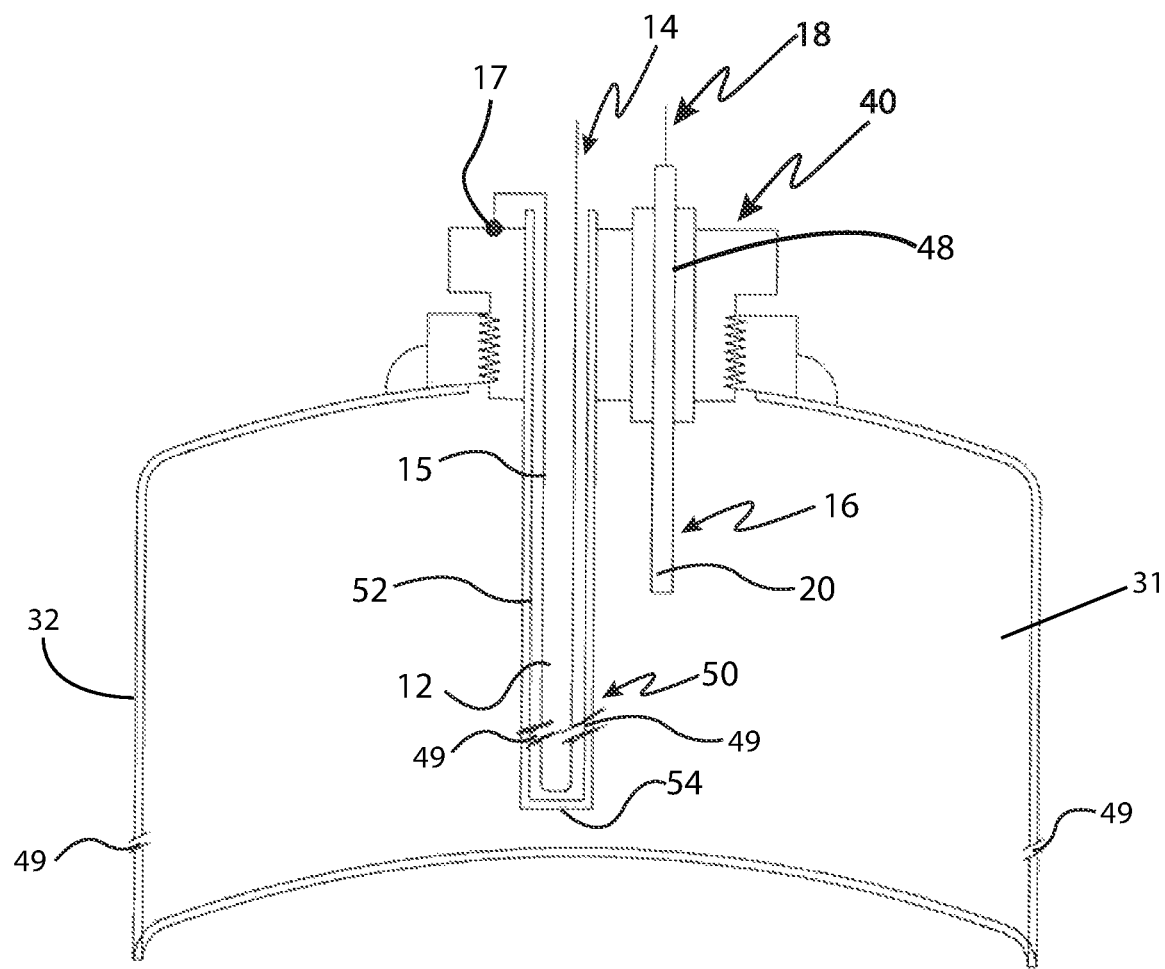
FIG. 2 is a schematic illustration of a monitoring system according to another embodiment.

FIG. 2 illustrates a further embodiment of monitoring system. The system is substantially the same as that of FIG. 1 and as such the same reference numerals have been used in FIG. 2 to identify the same parts described with reference to FIG. 1.

In the FIG. 2 embodiment, a housing 50 is provided which extends into the interior 31 of the storage vessel 32. The housing 50 provides a space 55 for receiving the wire loop 15. The housing 50 is in the form of an elongated, thin tubular body 52 having a closed inner end 54. An upper end of the tubular body 52 is mounted to the fitting 40. The end 17 of the wire is connected to the fitting 40 and the other end 19 is operatively connected to the first electrical circuitry 14. Thus, the wire loop 15 is isolated from the water in the heater.

The circuitry 14 is not shown in FIG. 2 but is the same as that shown in FIG. 1. Thus it can be seen that the wire 15 is contained within the housing 50. The housing 50 could be formed from any suitable metal which is suitably electrically isolated. For example, the metal housing may be suitably coated. In one example the housing may be formed from titanium because of its high strength and corrosion resistance. In this embodiment the impressed current anode 20 is mounted and connected to the second electrical metering circuit as shown in FIG. 1.

Figure 3:
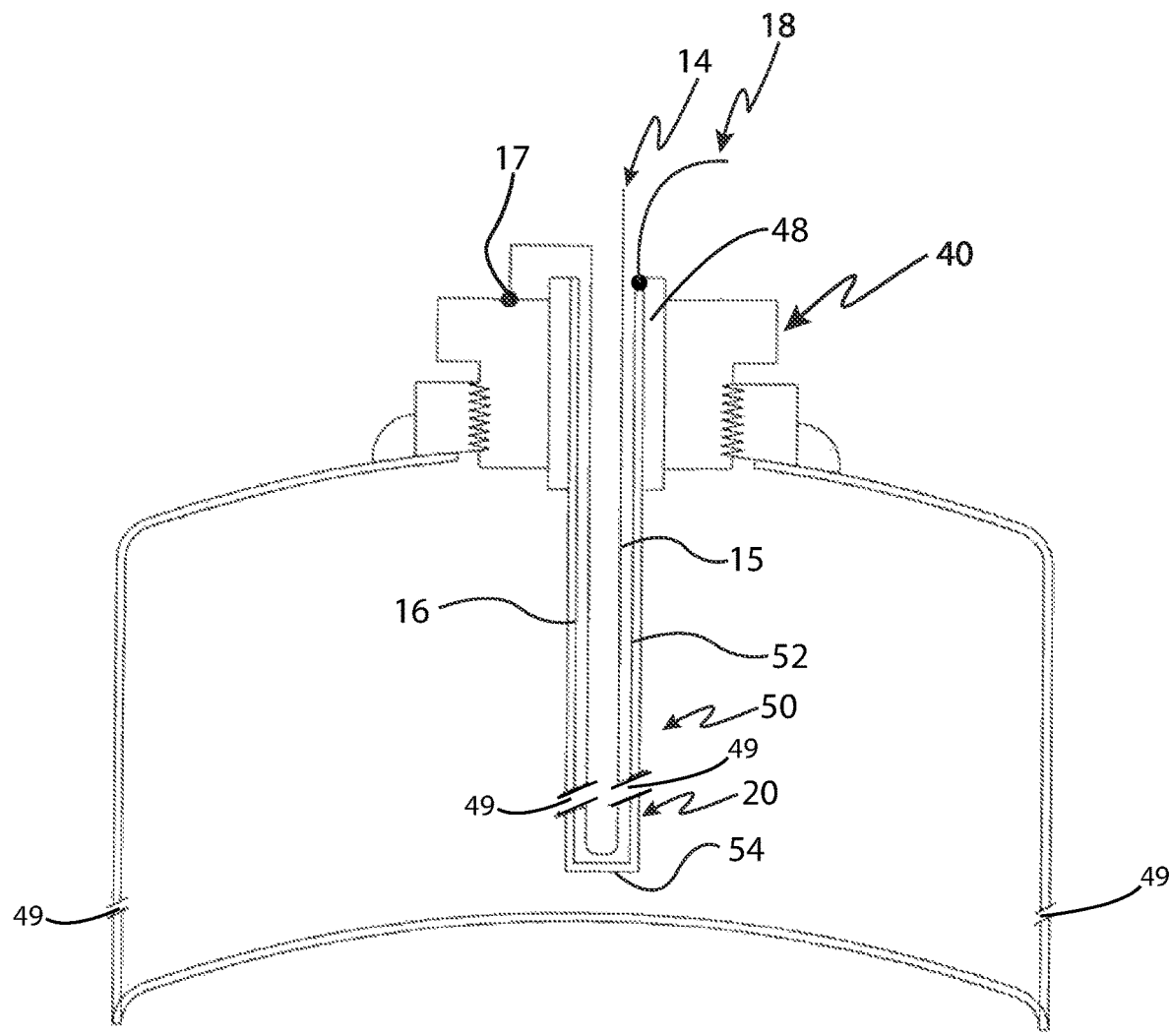
FIG. 3 is a schematic illustration of a monitoring system according to yet another embodiment.

In the embodiment of FIG. 3 the impressed current anode 20 as shown in FIG. 1 is replaced by the housing 50 which is configured to form part of an impressed current anode 20. In this embodiment the housing 50 is electrically connected to the second electrical metering circuitry 18 shown in FIG. 1. In this particular embodiment the housing 50 is formed preferably from titanium. In this embodiment the housing 50 passes through a sleeve 48 in the fitting 40.

The housing 50 is adapted to be formed to enclose and thereby protect the wire loop 15, and consequently, may be formed of any suitable dimensions so as to function accordingly. Typical dimensions of a housing 50, in a domestic hot water heater which uses a wire of 0.3 mm diameter, may be of the order of 4 mm diameter and have a wall thickness of 0-4 mm. It will however be appreciated that depending upon the internal tank pressures, manufacturing processes, handling and shipping considerations, etc., these dimensions will vary accordingly. It will also be appreciated that alternative materials may be used instead of titanium which have high strength, corrosion protection, and good thermal characteristics. For example, the housing may alternatively be formed of nickel.

In the particular application where existing storage vessels are used, the port 37 and associated coupling member 38 may have been adapted for mounting an anode of the sacrificial type to the storage vessel. Typically, currently existing heaters are provided with a sacrificial anode or galvanic anode which assists in protecting the storage vessel from corrosive deterioration. This type of anode may comprise a rod which includes a metal alloy which is more active than the metal from which the storage vessel wall is formed. That is the anode includes a metal or metal alloy with a more negative potential than that of the storage vessel wall. Thus the sacrificial anode can be readily replaced by the new sensor assembly.

In the forgoing description of preferred embodiments, specific terminology has been resorted to for the sake of clarity. However, the invention is not intended to be limited to specific terms so selected, and it is to be understood that each specific term includes all technical equivalents which operate in a similar manner to accomplish a similar technical purpose. Terms such as "front" and "rear", "inner" and "outer", "above", "below", "upper" and "lower" and the like are used as words of convenience to provide reference points and are not to be construed as limiting terms.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

In this specification the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, addition and/or changes can be made thereto without departing from the scope and spirit of the disclosed embodiments, the embodiments being illustrative and not restrictive.

Furthermore, invention(s) have been describe in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g. aspects of one embodiment may be combined with aspects of another embodiment to realise yet other embodiments. Further, each independent feature or component of any given assembly may constitute an additional embodiment.

The reference numerals in the following claims do not in any way limit the scope of the respective claims.

| TABLE OF PARTS | |
|---|---|
| Monitoring system | 10 |
| Water heater | 30 |
| Storage vessel | 32 |
| Vessel interior | 31 |
| Upper end | 33 |
| Lower end | 34 |
| Wall | 35 |
| Inner surface | 36 |
| Port | 37 |
| Coupling member | 38 |
| First sensor | 12 |
| First electrical metering circuitry | 14 |
| Wire loop | 15 |
| Ends | 17, 19 |
| Second sensor | 16 |
| Second electrical metering circuitry | 18 |
| Impressed current anode | 20 |
| Switch | 22 |
| Controller | 24 |
| Power source | 26 |
| Processor and communications path | 28 |
| Fitting | 40 |
| Fitting body | 41 |
| Threaded section | 45 |
| Threaded section | 46 |
| Sensor assembly | 43 |
| Sleeve | 48 |
| Discontinuities | 49 |
| Housing | 50 |
| Elongated tube | 52 |
| Closed end | 54 |
| Space | 55 |

The invention claimed is:

1. A monitoring system for monitoring selected parameters of a fluid heater, the heater comprising a storage vessel for storing heated fluid therein, the monitoring system comprising:
    a temperature sensor and associated first electrical metering circuitry for sensing the temperature of the fluid within the storage vessel;
    an impressed current anode and associated second electrical metering circuitry, wherein the first electrical metering circuitry and the second electrical metering circuitry are connected to a power source configured to provide electric power to the monitoring system;
    a control switch configured to be in a first position in which the first electrical metering circuitry is connected to the power source and the second electrical metering circuitry is disconnected from the power source, and a second position in which the second electrical metering circuitry is connected to the power source and the first electrical metering circuitry is disconnected from the power source; and
    a controller configured to periodically switch the control switch among one of the first position and the second position.

2. The monitoring system according to claim 1, further comprising a data transmitter operably associated with the first electrical metering circuitry and the second electrical metering circuitry for transmitting collected data to a remote location.

3. The monitoring system according to claim 1, wherein the temperature sensor comprises a length of wire configured in the form of one or more loops which, when installed, extends from one end of the storage vessel towards an opposite end thereof, the one or more loops having two ends, one being in electrical contact with the storage vessel and the other end being operatively connected to the first associated electrical circuitry, the length of wire being adapted so as to exhibit temperature dependent resistance along its length and configured to facilitate determining the average temperature of the fluid within the storage vessel.

4. The monitoring system according to claim 3, wherein each of the one or more loops substantially extends from one end of the storage vessel to the other.

5. The monitoring system according to claim 3, further comprising a housing which, when installed, is operatively mounted so as to extend into the storage vessel and is arranged to enclose the length of wire therein.

6. The monitoring system according to claim 5, wherein the housing comprises an elongated substantially tubular body having a closed inner end.

7. The monitoring system according to claim 5, wherein the housing is configured so as to form at least part of the impressed current anode.

8. The monitoring system according to claim 5, further comprising a fitting to which the temperature sensor and impressed current anode are mounted, the fitting being adapted to be secured to a wall section of the storage vessel.

9. The monitoring system according to claim 8, wherein said housing is operatively mounted to the fitting.

10. The monitoring system according to claim 9, wherein the fitting is adapted to be retrofitted to existing storage vessels.

11. The monitoring system according to claim 10, wherein the fitting is adapted for use with a coupling in a wall of the existing storage vessel.

12. The monitoring system according to claim 1, wherein the impressed current anode is disposed within the storage vessel when installed.

13. The monitoring system according to claim 1, wherein the control switch is further configured to be in a neutral position in which neither the first electrical metering circuitry nor the second electrical metering circuitry is connected to the power source, and wherein the controller is further configured to periodically switch the control switch among one of the first position, and the second position, and the neutral position.

14. A method of retrofitting a fluid heater with the monitoring system according to claim 8, wherein the fluid heater comprises a storage vessel having a vessel wall and a port in the vessel wall, wherein the fitting is configured so as to be operatively connected to the port, the method comprising the steps of locating the temperature sensor and impressed current anode within the interior of the storage vessel and securing the fitting to the storage vessel in the region of the port.

15. The method according to claim 14, wherein the storage vessel includes a coupling member at the port, the fitting being connected to the coupling member.

16. The method according to claim 15, wherein the fitting and the coupling member comprise complementary threaded sections providing for the connection therebetween.

17. The method according to claim 16, wherein the heater includes a sacrificial anode mounted to the vessel wall so as to extend into the interior through the port, the method including removing the sacrificial anode and replacing it with the temperature sensor and impressed current anode.

* * * * *